United States Patent [19]
Harty et al.

[11] Patent Number: 5,188,442
[45] Date of Patent: Feb. 23, 1993

[54] DRAWER ASSEMBLY FOR FISHERMAN'S CHAIR SEAT

[75] Inventors: Douglas E. Harty, Cannon Falls; Bill J. Parsons, Northfield, both of Minn.

[73] Assignee: Plastic Innovation, Inc., Cannon Falls, Minn.

[21] Appl. No.: 637,337

[22] Filed: Jan. 3, 1991

[51] Int. Cl.$^5$ .................................. A47B 83/00
[52] U.S. Cl. .................. 312/235.8; 297/192; 297/378; 312/334.23; 312/334.44
[58] Field of Search ............ 297/192, 378, 379; 312/235.2, 235.8, 342, 345, 334.23, 334.44; 224/275; 5/308

[56] References Cited

U.S. PATENT DOCUMENTS

| 919,682 | 4/1990 | Bertram | 312/345 |
|---|---|---|---|
| 1,866,464 | 7/1932 | Hallowell et al. | 312/345 |
| 2,210,347 | 8/1940 | Story | 224/275 |
| 2,484,454 | 10/1949 | Heifner | 297/378 |
| 3,623,683 | 11/1971 | Bennett | 224/275 |
| 4,682,813 | 7/1987 | Fohr et al. | 297/192 |
| 4,790,432 | 12/1988 | Rees | 297/192 |

FOREIGN PATENT DOCUMENTS 2724067 12/1978 Fed. Rep. of Germany ...... 297/192

OTHER PUBLICATIONS

T.O. Plastics, Inc., *Stow-A-Way Drawer*, 2 pages.

Primary Examiner—Kenneth J. Dorner
Assistant Examiner—Gerald A. Anderson
Attorney, Agent, or Firm—Kinney & Lange

[57] ABSTRACT

In a drawer assembly for use with a chair seat having a generally flat, generally horizontal bottom surface, a drawer positioning plate is attached to the chair seat bottom surface, and drawer stop means are installed through stop means positioning holes already present in the drawer positioning plate. With the chair seat inverted, the drawer is properly positioned on the positioning plate, and a pair of drawer slides with screw hole receiving openings provided therein are aligned with drawer slide screw positionings provided in the positioning plate, and screws are used to fasten the door slides and consequently the drawer into final position.

10 Claims, 5 Drawing Sheets

DRAWER ASSEMBLY FOR FISHERMAN'S CHAIR SEAT

BACKGROUND OF THE INVENTION

This invention has relation to an assembly for supporting a drawer beneath the seat of a fisherman's chair or at other locations where a drawer need be accessed quickly, conveniently and without concern for the drawer jamming or moving past a predetermined nominally closed or nominally open position.

Storage drawers movable between open positions and closed positions inside of some kind of a file case, cabinet, bureau, under a kitchen type cabinet or the like have been known for hundreds if not thousands of years. Complicated drawer slides have been highly developed in the file cabinet art to allow drawers to slide entirely out of their cabinets while still being supported with respect to the interior thereof. Primarily by the use of vertical flanges on the outside of drawers, means has been provided to assure that drawers do not move inwardly passed their nominal closed conditions.

Others have attempted to mount drawers underneath the bottom surfaces of pedestal boat seats, but the difficulty in accommodating various models and sizes of boat seats and the difficulty of effectively fastening drawer rails to the underside of boat seats precisely enough to allow uniform, constant and jam-free mounting of drawers to such rails has been difficult to say the least. It was to overcome these difficulties that the drawer assembly was developed.

SUMMARY OF THE INVENTION

A drawer assembly for use with a chair seat having an upper sitting surface and a lower generally flat, generally horizontal bottom surface includes a box-like open-top drawer having front, back and side walls, all terminating at the top of the drawer in a common horizontal plane. The drawer also has a pair of drawer support flanges, each flange extending horizontally and integrally outwardly from a top edge portion of one of the side walls and extending horizontally rearwardly of the drawer back wall. A pair of drawer slides are adapted to be fixedly positioned with respect to the seat below the chair seat bottom surface. Each slide, when so positioned is adapted to support one of the drawer support flanges to permit movement of the drawer between an open position with the top edge of its back wall located adjacent to and below a front edge of the chair seat and a closed position with a top edge of its front wall located adjacent to and below said front edge of the seat.

The drawer support flanges extend rearwardly beyond the back wall of the drawer for a sufficient distance to firmly support the drawer in the drawer slides when the drawer is in its open position.

Means are provided to limit forward movement of the drawer beyond the open position and means are provided to limit rearward movement of the drawer beyond the closed position.

In one form of the invention as shown, a drawer positioning plate is attached to the generally horizontal bottom surface of the chair seat to lie between the drawer and drawer slides on the one hand and the bottom surface of the chair seat on the other.

In that form of the invention, the means for limiting the forward movement of the drawer beyond the open position and the means for limiting the rearward movement of the drawer past the closed position are constituted as at least one single stop extending downwardly from the chair seat, through the positioning plate, and into interfering relationship with the forward wall and extension of the rearward wall thus to limit drawer movement and to keep the drawer from coming out of the drawer slides or moving back out of reach.

To make the drawer assembly easy to install, openings to positively position the fastening means for the drawer slides and for the drawer stop means are provided through the positioning plate. Once the positioning plate is situated properly with respect to the bottom surface of the chair seat, the proper positioning of all of the other parts of the assembly is assured. Those parts of the assembly with the provided openings are lined up with the matching openings in the positioning plate, and fastening means such as screws, for example, are passed through those openings to hold those parts of the assembly in place.

DETAILED DESCRIPTION OF THE PREFERRED EMBODIMENTS

Figure 1:
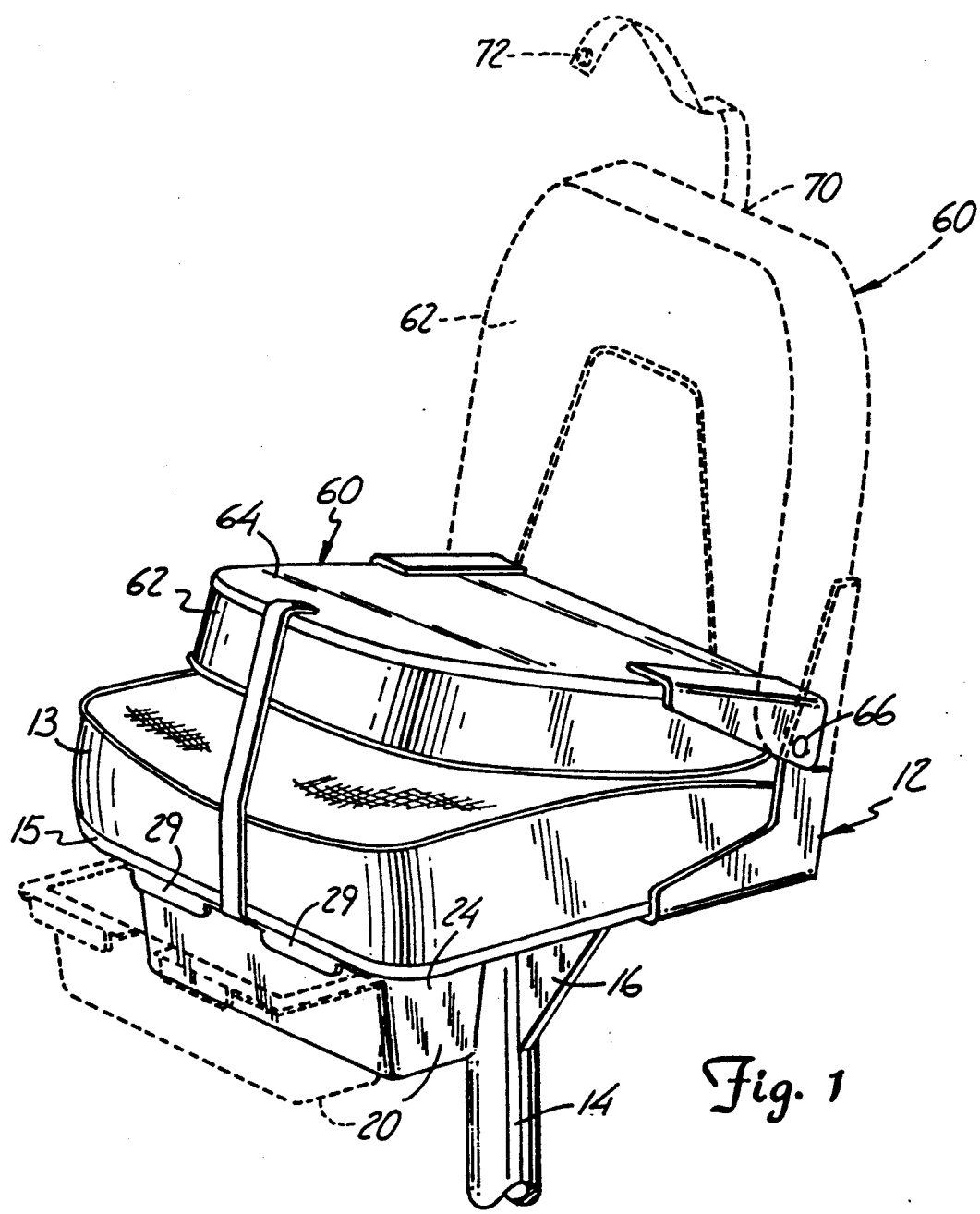
FIG. 1 is a perspective view of a drawer of the drawer assembly of the present invention showing the relation of the drawer and drawer assembly to a chair seat having a chair back in a stowed condition, with the drawer in a closed position in its environment of intended use.
Figure 2:
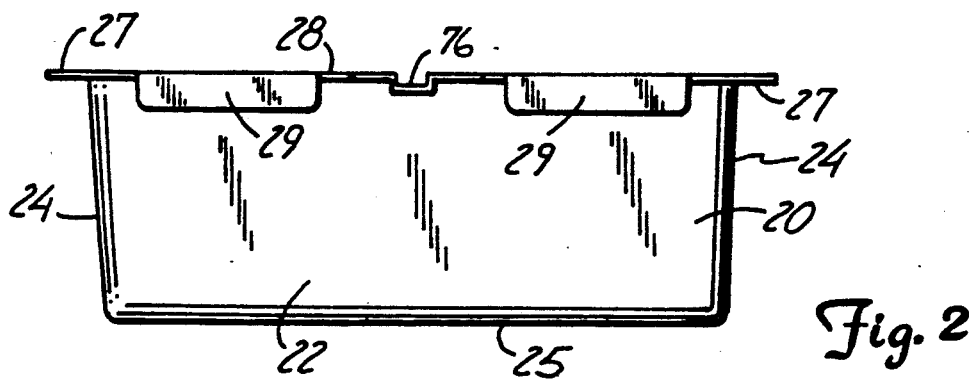
FIG. 2 is an enlarged front elevational view of the drawer of FIG. 1.
Figure 3:
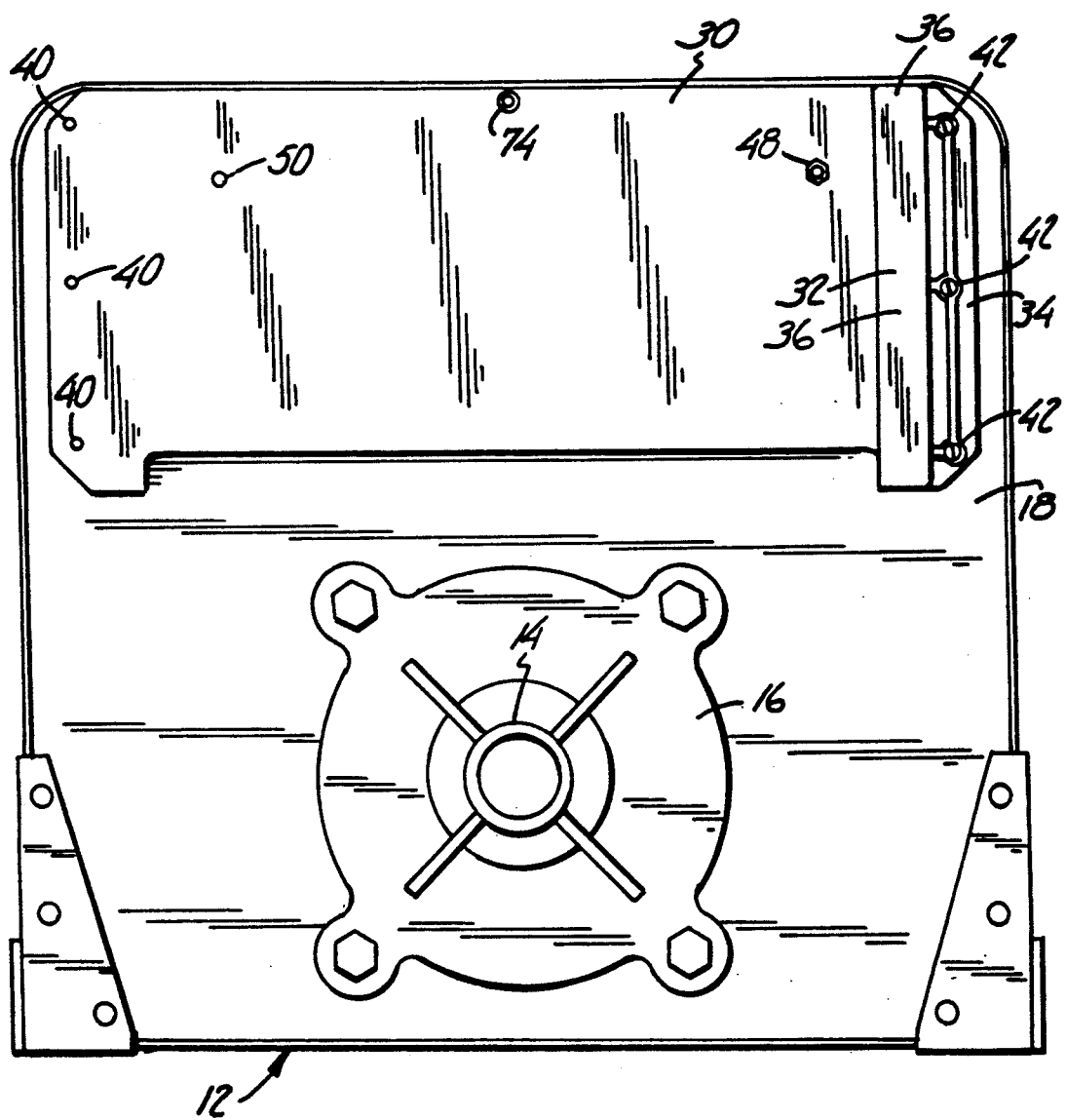
FIG. 3 is a bottom plan view of a drawer positioning plate and one drawer slide of the drawer assembly showing their relationship to a horizontal bottom surface of the chair seat of FIG. 1.

A drawer assembly 10 is for use with a fisherman's chair seat 12 of the type generally positioned toward the stern of a fishing boat in position where a fisherman can cast or troll, hook and play a fish with his or her fishing tackle without necessarily moving from the seat. The seat includes a resilient cushion 13 and a wood or plastic seat base 15. As shown, the chair seat base 15 is supported on a seat support column 14 by means of a seat support fitting 16 as best seen in FIGS. 1 and 3. The positioning of the fitting 16 with respect to a horizontal bottom surface 18 of the base 15 of the chair seat 12 is such that there is a substantial area on which to support the drawer assembly adjacent a front edge portion of the bottom surface 18.

The drawer assembly 10 includes a drawer 20 having a front wall 22, a back wall 23 and side walls 24, 24 forming a open-top box-like drawer bounded by a bottom wall 25. The back and side walls and substantially all of the front wall terminate at the top of the drawer in a common horizontal plane. A pair of drain holes 26, 26 are provided in bottom wall 25 to discharge any water or other liquid accidentally or purposefully present in the drawer.

Drawer support flanges 27, 27 each extend integrally and horizontally outwardly from a top edge portion of one of the side walls 24 and, further, extend horizontally rearwardly of the drawer back wall 23.

A drawer pull flange 28 extends integrally horizontally forwardly from the top of the front wall 22. As shown, this flange is interrupted at a central portion of the top wall. Two drawer pulls 29, 29 each extend integrally and vertically downwardly from the forward edge of the drawer pull flange 28.

For ease and precision of mounting of the drawer assembly with respect to the bottom surface 18 of base 15 of the chair seat 12, and to serve as a protective cover to the drawer 20 when the drawer is in closed position, a drawer positioning plate 30 is provided.

Figure 4:
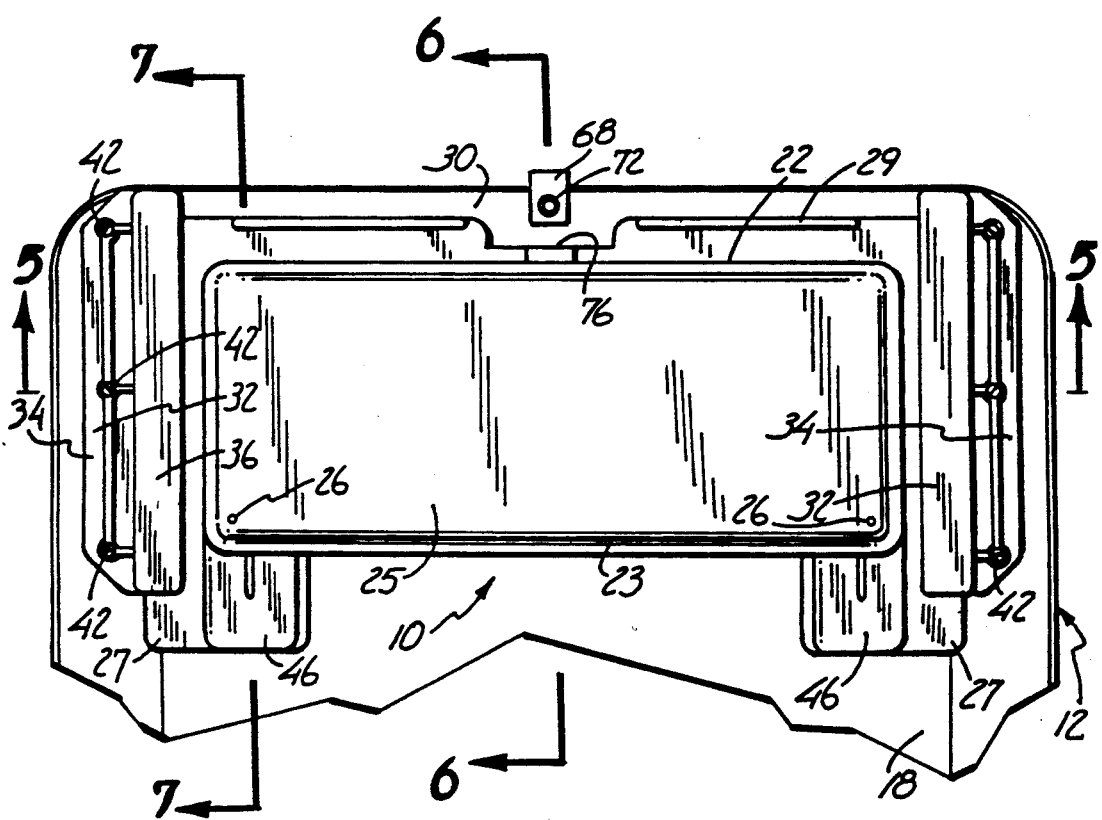
FIG. 4 is a bottom plan view of the entire drawer assembly of the invention showing its relationship to the horizontal bottom surface of the chair of FIG. 1 with drawer in closed position.
Figure 8:
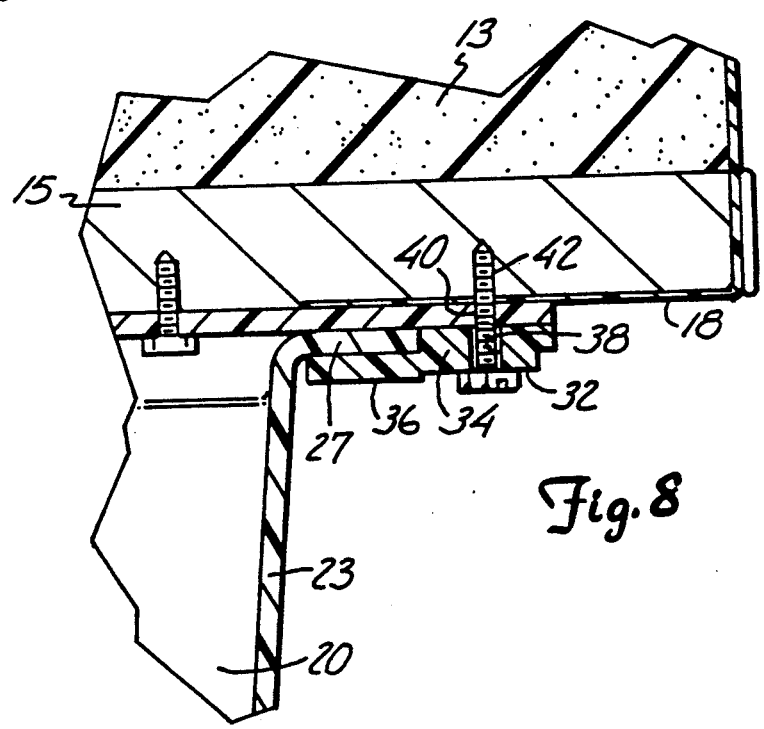
FIG. 8 is a fragmentary, further enlarged, vertical sectional view of the encircled portion 8 in FIG. 5.

To position the drawer 20 with respect to the positioning plate 30, after the positioning plate is correctly positioned with respect to the bottom surface 18 of the chair seat 12, a pair of drawer slides 32, 32 are provided. As best seen in FIGS. 3, 4 and 8, each drawer slide is provided with a flat, longitudinally extending base 34 and an offset drawer support flange receiving slide plate 36. Each drawer slide 32 is provided with three fastener receiving openings or screw holes 38. See FIG. 8. Drawer positioning plate 30 is provided with six fastener receiving openings or screw holes 40 each positioned to align with one of the screw holes 38 when the drawer slides 32, 32 are to be precisely positioned to support drawer support flanges 27, 27. See FIG. 3. Fasteners in the form of screws 42 each extend through a set of screw holes 38, 40 when the drawer assembly is finally installed on the chair seat.

Figure 6:
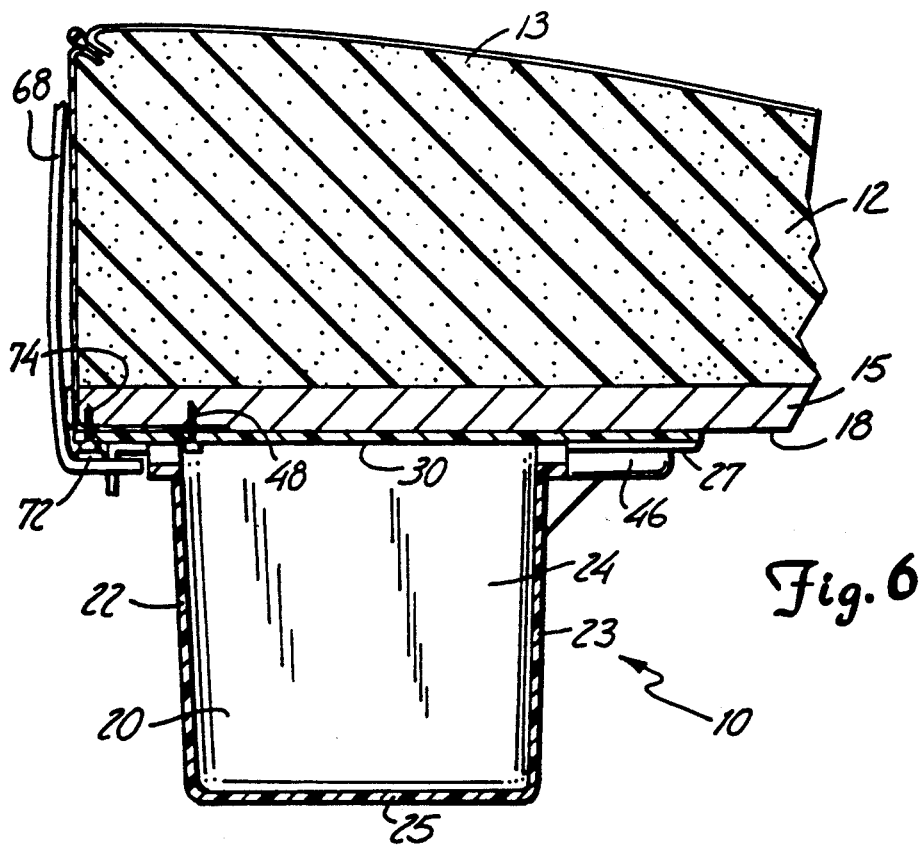
FIG. 6 is an upright, enlarged vertical sectional view taken on line 6—6 in FIG. 4.
Figure 5:
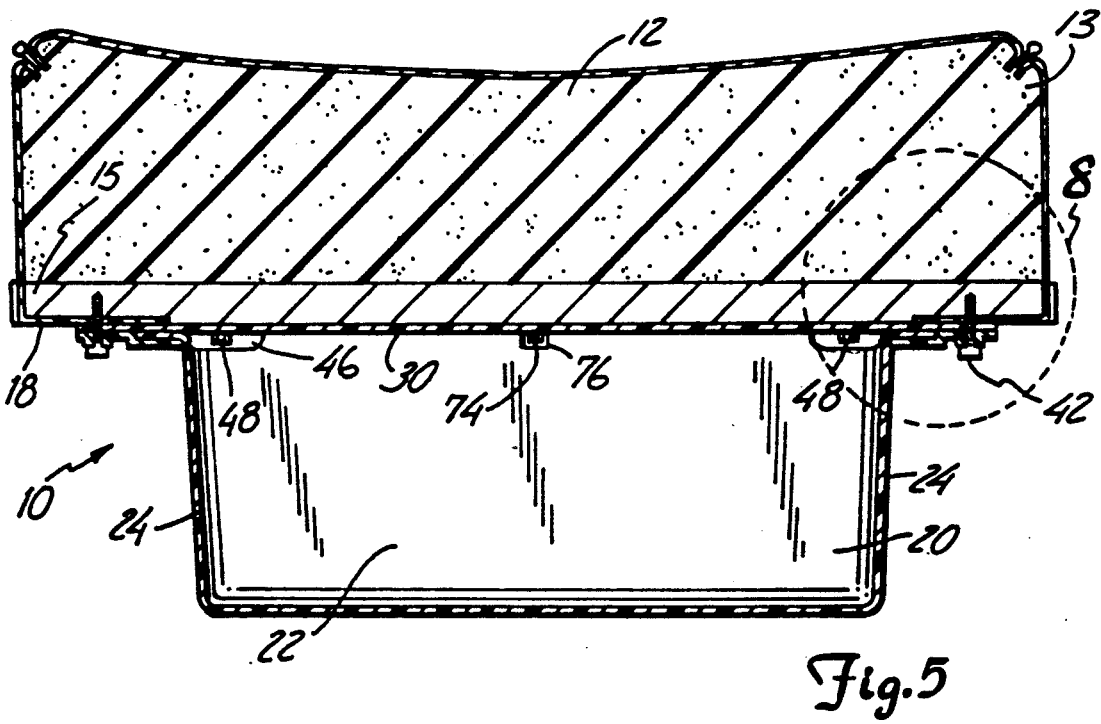
FIG. 5 is an upright vertical sectional view taken on line 5—5 in FIG. 4.
Figure 7:
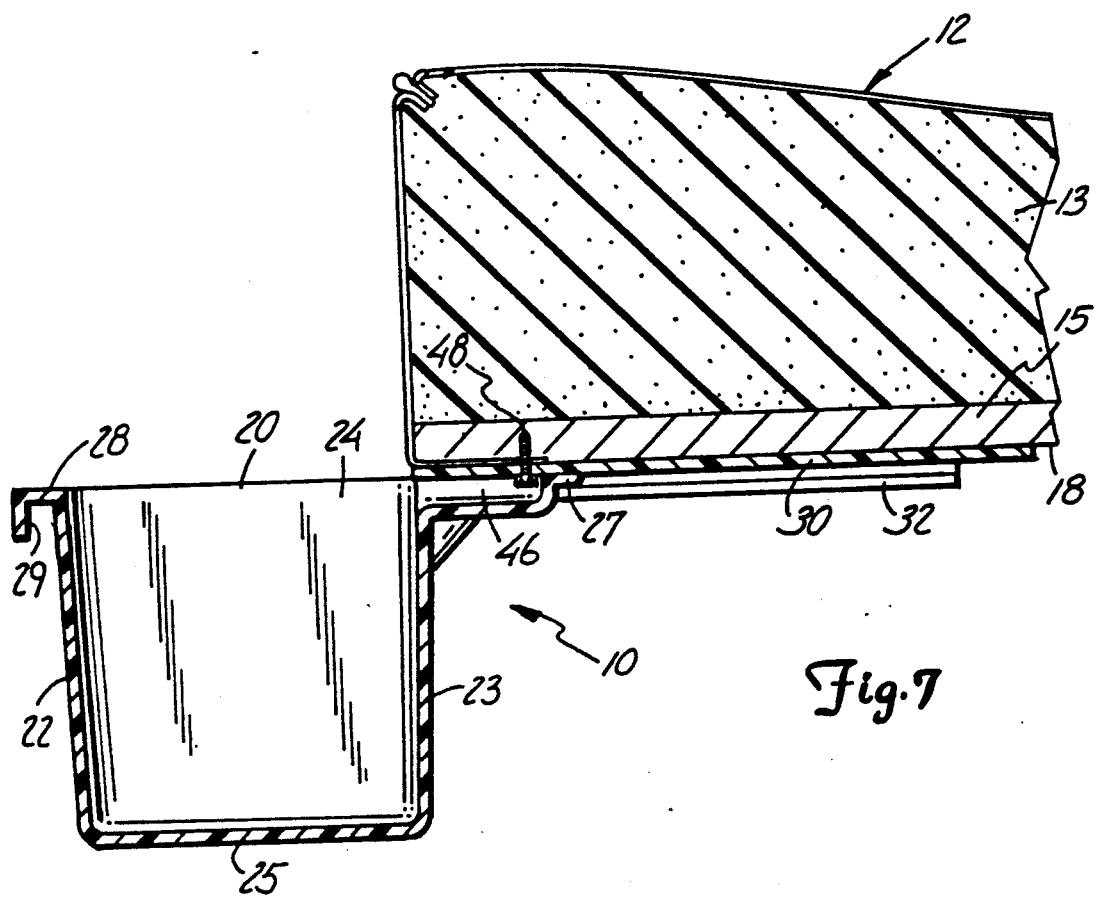
FIG. 7 is an upright, enlarged vertical sectional view taken on the line 7—7 in FIG. 4 but showing the drawer in its open position.

That portion of drawer support flanges 27, 27 which extend rearwardly from back wall 23 are each formed with a trough-like depression or projection 46 therein. See FIGS. 4, 6 and 7. In order to limit the forward movement of the drawer 20 beyond its open position as seen in FIG. 7, a screw-like drawer stop 48 is mounted through the positioning plate 30 and into the horizontal bottom surface 18 of the chair 12. This stop extends downwardly into the drawer 20 to come into movement limiting relation to the end of that trough-like depression 46 when the drawer 20 has been moved into its open position as seen in FIG. 7. To positively position the drawer stop 48 in advance of its installation, a pair of drawer stop positioning holes 50, 50 are provided in the drawer positioning plate 30 as seen in FIG. 3. Drawer stops 48 are so positioned that when the drawer is in its closed position as seen in that FIG. 6, the stops come into rearward movement preventing relation with respect to the front wall 22 of the drawer.

As seen in FIG. 1, the fisherman's chair seat 12 is augmented by a hinged seat back 60 consisting of a resilient seat back cushion 62 and a wooden or plastic seat back base 64 hingedly mounted with respect to the seat base 15 as at 66. The normal positioning of the seat back 60 when a fisherman is using a chair seat is shown in dotted lines in FIG. 1. When the chair seat and the boat in which it is mounted are not being used for their intended purposes, it is advantageous to stow the hinged seat back so that, for example, it comes below the gunwales of the boat so that the entire boat can be more easily covered over. Since many such boats with fisherman's chair seats are transported in trailers over the highways, it is useful to prevent bouncing or vibrated movements of the hinged seat back with respect to the chair seat. It is common practice, therefore, to provide a chair seat stowage strap 68 having a first end permanently attached as at 70 to an upper end portion of the seat back base 64 of the seat back 60 as viewed in dotted lines in FIG. 1. The free outer end of the stowage strap 68 is provided with a first snap or fastening means 72. See FIGS. 1 and 4. A second snap or fastening means 74 is permanently attached with respect to a forward edge portion of the base 15 of the seat 12, as seen in FIGS. 3 and 6. The snaps 72 and 74 cooperate with each other to hold the stowage strap 68 in tension in the position as seen in full lines in FIG. 1. The resilience of the seat cushions 13 and 62 make this possible. As best seen in FIG. 3, while the second snap 74 is clear of the front wall 22 of the drawer, and the first snap 72 is connected to it, that first snap comes into interfering relation with respect to the front wall 22, and the drawer is prevented from moving out of its closed position as seen in that figure as long as the snap 72 and its stowage strap 68 are in place.

In the form of the invention as shown, the second snap 74 extends downwardly from the bottom surface of the drawer positioning plate 30, so an inverted tunnel 76 is provided in the drawer front wall 22 to allow the wall to pass freely over the second snap 74. The shape of this tunnel 76 is such that the wall 22 cannot pass over the first snap 72 while it is fastened to snap 74.

Although the present invention has been described with reference to preferred embodiments, workers skilled in the art will recognize that changes may be made in form and detail without departing from the spirit and scope of the invention.

What is claimed is:

1. A drawer assembly attached to a chair seat having an upper sitting surface, a lower generally flat, generally horizontal bottom surface and a hinged seat back movable between an upright condition and a forwardly folded condition, the chair seat being supported at a sitting height by support means which leaves a drawer support area adjacent a front edge portion of the chair seat bottom surface clear of obstruction; the drawer assembly including:
   (a) a box-like open-top drawer having front, back and side walls terminating at the top of the drawer in a common horizontal plane, the drawer also having a pair of drawer support flanges, each flange extending horizontally and outwardly from a top edge portion of one of the side walls and extending horizontally rearwardly beyond the drawer back wall;
   (b) a pair of drawer slides adapted to be fixedly positioned on the chair seat bottom surface, each slide, when so positioned, being adapted to support one of the drawer support flanges to permit movement of the drawer between an open position with a top edge of said back wall located adjacent to and below a front edge of the chair seat and a closed position with a top edge of said front wall located adjacent to and below said front edge of said seat;
   (c) wherein the drawer support flanges extend rearwardly beyond the back wall of the drawer for a sufficient distance to firmly support the drawer in the drawer slides when the drawer is in said open position;
   (d) wherein means is provided to limit forward movement of the drawer beyond said open position;

(e) wherein means is provided to limit rearward movement of the drawer passed said closed position; and
(f) wherein a releasable means is provided for cooperation with the seat back, when the seat back is in the forwardly folded condition, and the chair seat bottom surface to temporarily prevent movement of the drawer from its closed position toward its open position.

2. The drawer assembly of claim 1 wherein the chair seat also has a seat back stowage strap fixedly mounted at said one end to the seat back at an upper edge portion of the seat back, a first strap fastener at a second end of the strap, and a second strap fastener mounted to the chair seat bottom surface adjacent the front edge of the seat to be in clearing relation to the drawer front wall, the second fastener being adapted to releasably connect with the first fastener to position the strap to hold the chair back in said stowed condition:
(g) wherein the drawer assembly releasable means for preventing movement of the drawer from said closed position toward said open position includes the first strap fastener when connected to the second strap fastener to form a barrier positioned in interfering relation to a top edge portion of the drawer front wall to prevent movement of the closed drawer from said closed position.

3. The drawer assembly of claim 1 wherein:
(g) a drawer positioning plate is attached to the generally horizontal bottom surface of the chair seat to lie between the drawer slides and the bottom surface of the chair seat.

4. The drawer assembly of claim 3 wherein:
(h) the drawer slides are mounted through the drawer positioning plate to have fixed position with respect to the plate; and
(i) the drawer positioning plate is partially defined by a plate bottom surface lying in a generally horizontal plane which is shaped so as to substantially completely encompass the top edges of the front, back and side walls of the drawer when the drawer is in its closed position.

5. The drawer assembly of claim 4 wherein:
(j) the rearward extensions of at least one drawer support flanges of the drawer back wall provides a trough shaped depression extending longitudinally in parallel relationship to the drawer side walls, said trough shaped depression being open to the interior of the drawer through an upper edge portion of the drawer back wall; and
(k) said means for limiting forward movement of the drawer beyond said open position includes at least one drawer stop extending through the drawer positioning plate adjacent a forward edge portion of the chair seat in aligned relationship with the at least one trough shaped depression and so positioned as to come into stopping relationship to a rearward edge of an aligned projection of the trough shaped depression when the drawer reaches said open position.

6. The drawer assembly of claim 5 wherein:
(l) the means for limiting movement of the drawer passed said closed position includes at least one drawer stop extending through the drawer positioning plate adjacent a forward edge portion of the chair seat and so positioned as to come into stopping relationship to the interior of the front drawer wall when the drawer reaches said closed position.

7. The drawer assembly of claim 6 wherein:
(m) the drawer stop limiting drawer movement passed said open position is the same drawer stop limiting drawer movement passed said closed position.

8. The drawer assembly of claim 3 wherein:
(h) the drawer has a forwardly extending drawer pull flange, and at least one drawer pull extending integrally downwardly from a front edge of such drawer pull flange.

9. The drawer assembly of claim 3 wherein:
(h) each drawer slide is provided with at least two fastener receiving openings therethrough;
(i) the drawer positioning plate is provided with matching fastener receiving openings aligned to precisely position the drawer slides with respect to the plate; and
(j) fastening means extending through said openings to fasten the drawer slides through the drawer positioning plate openings to the horizontal bottom surface of the chair seat.

10. The drawer assembly of claim 9 wherein:
(k) the drawer positioning plate is provided with at least one additional fastener receiving opening to receive the drawer stop.

* * * * *

UNITED STATES PATENT AND TRADEMARK OFFICE
CERTIFICATE OF CORRECTION

PATENT NO. : 5,188,442

DATED : February 23, 1993

INVENTOR(S) : DOUGLAS E. HARTY, BILL J. PARSONS

It is certified that error appears in the above-identified patent and that said Letters Patent is hereby corrected as shown below:

Col. 6, line 30, delete "such", insert --said--

Signed and Sealed this

Twenty-third Day of November, 1993

Attest:

BRUCE LEHMAN

*Attesting Officer*   *Commissioner of Patents and Trademarks*